Dec. 12, 1944.  W. E. ZIEGLER  2,364,682
HOSE-COUPLING INSERTING MACHINE
Filed Dec. 15, 1942  2 Sheets-Sheet 1

INVENTOR
Wallace E. Ziegler
BY
ATTORNEY

Dec. 12, 1944.                    W. E. ZIEGLER                    2,364,682
                          HOSE-COUPLING INSERTING MACHINE
                          Filed Dec. 15, 1942            2 Sheets-Sheet 2

INVENTOR
BY  Wallace E. Ziegler
ATTORNEY

Patented Dec. 12, 1944

2,364,682

UNITED STATES PATENT OFFICE 2,364,682

HOSE-COUPLING INSERTING MACHINE

Wallace E. Ziegler, Philadelphia, Pa.

Application December 15, 1942, Serial No. 469,113

2 Claims. (Cl. 29—283)

(Granted under the act of March 3, 1883, as amended April 30, 1928; 370 O. G. 757)

This invention relates to machines for inserting couplings or fittings in hose ends.

Machines for inserting couplings in hose usually include a clamp of some kind, for holding the hose in place while a coupling-holding and inserting device, forces the coupling into the hose. Where it is desired to handle many pieces of hose and insert couplings therein, on a large scale, it is desirable to have the parts of the machine designed to be adapted for quick handling.

It is therefore among the objects of my invention to so design and construct the co-ordinating parts of the machine, as to afford simple and quick operations.

Another object of my invention is to provide in a hose coupling machine, a clamping device having a tubular member for holding a hose end portion in line with the coupling to be inserted, using a clamping lever member for manually holding the hose momentarily compressed within the tubular member, to resist displacement thereof during the forced insertion of the coupling into its end. In this connection, another object is to provide a series of tubular changeable hose holding members, adapted for use with various diameters of hose, having adaptor parts, such as semi-bushings, between the tubular holding member and a fixed support, so that, regardless of the size of tubular member used, axial positioning with a fixed axis of the coupling inserting member can be assured.

A further object is to provide with the hose clamping means, a form of self-centering device, that will hold centrally positioned, the coupling receiving end of any size hose within the capacity of the machine, so as to maintain its opening in line with the axis of the coupling-inserting part of the machine.

A further object is to provide quick-operating reciprocation to the coupling-inserting part of the machine by power means sufficiently strong to push the coupling or fitting straight into the end of the hose.

A further object is to supply this coupling-inserting part of the machine with an adaptor fitting for quickly mounting the hose couplings on said part before insertion and removing them after insertion.

With these and other objects which will hereinafter appear, one embodiment of my invention is illustrated in the accompanying drawings in which, Fig. 1 is a top plan view of one form of my invention;

Figure 1:
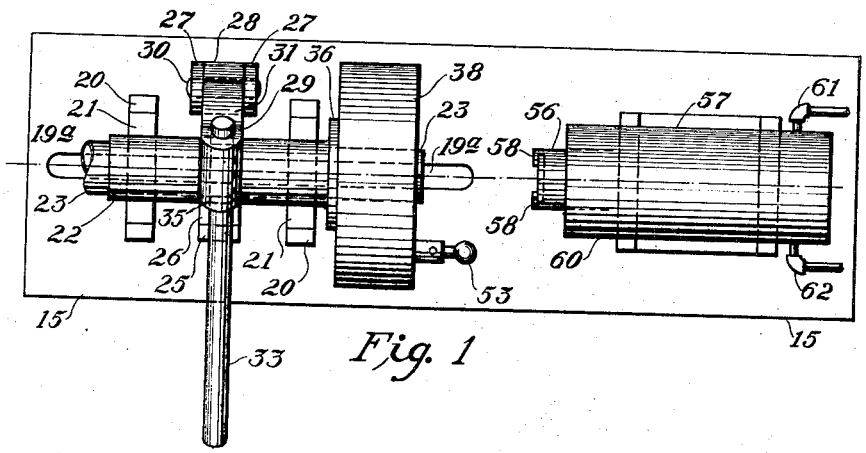
Figure 2:
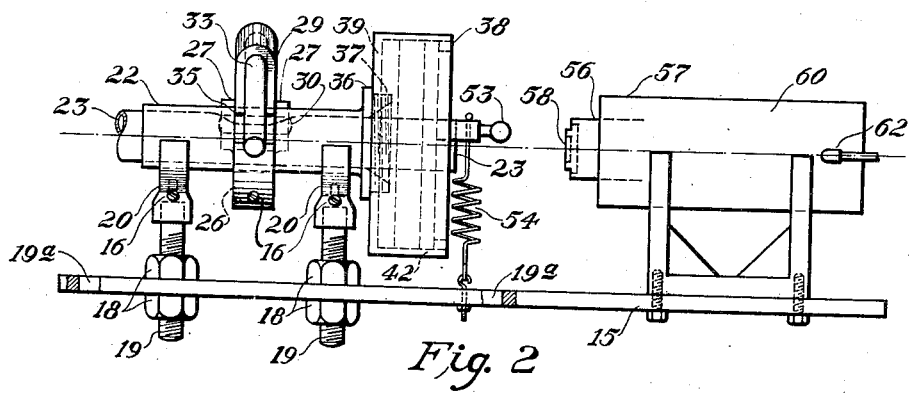
Fig. 2 is a side elevation of the machine shown in Fig. 1.

Similar parts in the several views are indicated by the same numerals. Mounted upon the base plate 15, are the upright standards, held thereon by nuts 18. Each standard is made up of a threaded rod 19, passing through the longitudinal plate slot 19ª, and is engaged by the nuts 18. Fixed to the top of each rod 19 is an arcuate saddle member 20, in which fits a semi-bushing 21 fastened thereto by screws 16. Fixed by screws 17 to the semi-bushing 21 and fitting therein, is the tubular clamp member 22. Under the middle portion of the tubular member 22 is attached a similar semi-bushing 26 to which a saddle member 25 is fastened. This saddle member has no standard but has a hinge at its rear end for one end of the clamping lever.

Various sizes of clamp members 22 are provided, to fit loosely around various sizes of hose 23, and accordingly various thicknesses of semi-bushings are provided, all having the same outside radius in order to fit the inside radius of the top parts 20 of the standards and the clamp saddle member 25.

Figure 3:
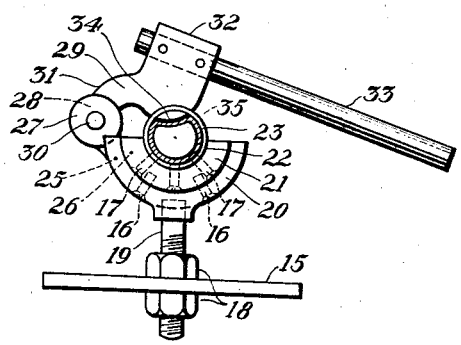
Fig. 3 is an end elevation of the manually operated clamping parts, including the clamping lever.
Figure 4:
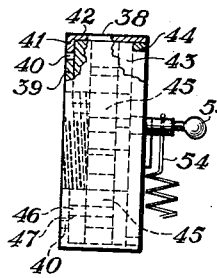
Fig. 4 is a side elevation, partly in section, of the self-centering device per se.
Figure 11:
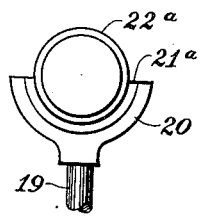
Fig. 11 is an end elevation of an upright standard part, holding a larger tubular hose holding member, with a thinner semi-bushing, than that shown in Fig. 3.
Figure 12:
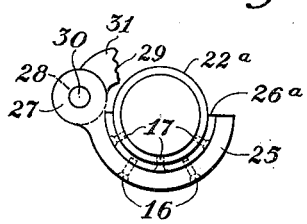
Fig. 12 is an end elevation of clamping parts with a larger tubular hose holding member and a thinner semi-bushing.

In Figs. 11 and 12, a larger size tubular clamp member 22ª is shown, but the semi-bushings 21ª and 26ª are thinner radially than the semi-bushings 21 and 26 of Fig. 3.

The clamp saddle member 25 has upstanding ears 27, engaged by the part 28, of the lever dog 29, there being a pin 30 passing through the ears 27 and the part 28, of the dog 29, to form a hinge upon which the lever clamp 31 swings. Pinned to the upper part 32, of the dog 29, and passing therethrough, is the lever rod 33, extending toward the operator. The depending curved part 34, of the dog 29, is adapted to pass down through the notch 35, in the tubular member 22, to compress and hold the hose 23, within. The forward end of the member 22 has a flange 36 and a threaded projection 37, upon which screws the hose self-centering device 38. The bore of the member 22, within the threaded part 37 is flared outward at 37ª, for clearance when inserting the coupling.

Figure 5:
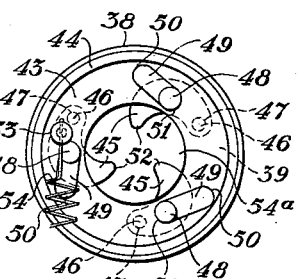
Fig. 5 is an end elevation of the device shown in Fig. 4.
Figures 6, 7:
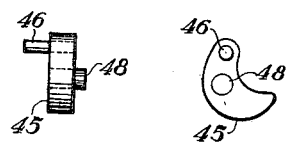
Fig. 6 is a side elevation of one of the pivoted holding fingers, shown in Figs. 4 and 5.
Fig. 7 is an end elevation of what is shown in Fig. 6.
Figure 8:
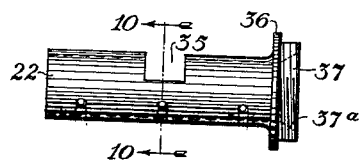
Fig. 8 is a side elevation of a tubular member of the hose clamp.
Figure 9:
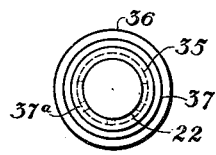
Fig. 9 is an end elevation of the member shown in Fig. 8.
Figure 10:
Fig. 10 is a section taken on the line 10—10 of Fig. 8.

This device 38 has a disc 39, threaded to engage the projection 37, of the member 22, and shoulders against the flange 36. An annular recess 40 is provided at the periphery of the disc 39, to receive the inturned flange 41, of the cylindrical shell 42. This shell 42 is fixed to the disc 39. Spaced from the disc 39, and slidingly fitting within the shell 42, is the disc 43, which slidingly bears against the ring 44, fixed to the shell 42. Loosely fitting between discs 39 and 43, are the fingers 45, each of which has a pivot pin 46, journaled within a bearing 47, in the disc 39. Spaced from the pin 46 and fixed within each finger 45, projects a pin 48. The pins 48 and 46 project from opposite sides of each finger 45. The pins 48 are in sliding engagement with the slots 49 in the disc 43. These slots 49 are preferably made straight and have their ends 50 at a greater distance from the disc center than their ends 51 are, so that when the disc 43 is turned clock-wise, as we view Fig. 5, the points 52, of the fingers 45, will all move outwardly simultaneously. Since the body of the self-centering device 38 is fixed to the tubular clamp member 22, and plate disc 43 is turnable within the shell 42, in order to cause a bias on the fingers 45 toward the center of the device, I provide a projecting pin 53, fixed to the disc 43 and connect this pin 53 by tension spring 54 to the base plate 15, tending to resiliently hold the disc 43 from turning clock-wise and thus have the hose end held centrally within the opening 54ª, yet resiliently so that a coupling may be readily inserted. But when inserting a hose end from the tubular member 22 into the self-centering device 38, fixed thereto, the operator lifts upon the pin 53 against the spring tension, thus moving the disc 43, clockwise (see Fig. 5) and opens up the points 52 of the fingers 45; as he brings the hose end opposite these fingers 45, he releases his hold on the pin 53.

Figure 13:
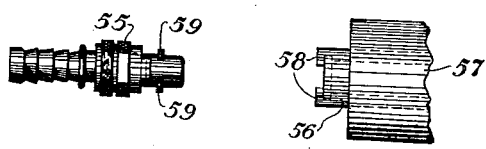
Fig. 13 is a side elevation of a coupling removed from the engageable holder or head of the inserting device.
Figure 14:
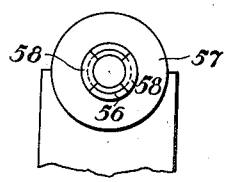
Fig. 14 is an end elevation of the engageable holder or head.

Referring now to the means for forcing a coupling or fitting into the centrally-held hose end, Fig. 13, at its left, shows a side elevation of an air hose coupling 55 and at its right, the engageable holder 56 of the coupling forcing means 57. Fig. 14 is an end elevation of the forcing means 57.

The engageable holder 56 has two projecting hook-like parts 58, adapted to engage the curved lugs 59, of the coupling 55. For use with a co-ordinating coupling to that shown in Fig. 13, an adapter fitting it and holder 56, can be provided. The holder 56 is adapted for movement in and out of the cylinder 60, within which is a plunger operated by compressed air or steam coming through a pipe connection 61 and exhausting through a connection 62, when the holder 56 is retracted by a spring within the cylinder 60. The forcing means to operate the holder 56 may be of any other suitable construction.

Thus it may be seen that my machine will enable a large turnout in the number of hose fittings that may be installed by one operator with ease, since the entire operation for inserting one fitting comprises inserting the end of the hose in the resilient jaws and mounting the coupling or other fitting on the holder or head 56 by means of a quick-mounting adaptor, then clamping the hose by means of lever handle 33 while applying the power means for inserting the coupling, followed by immediate release of the power means and quick removal of the installed coupling. This entire operation normally takes only a few seconds in comparison to the many minutes and painstaking effort it would otherwise take to install a tight fitting coupling.

My machine does the work well with no strenuous effort on the part of the operator and saves a lot of time, particularly in mass production where a large number of the same type of fittings are to be installed in one size hose pieces in preparation for the assembly line where the pieces are to be connected on machines being assembled.

Various modifications in details of the above-defined construction may be made without departing from the scope of my invention, as defined by the appended claims.

The invention described herein may be manufactured and used by or for the Government of the United States of America for governmental purposes without the payment of any royalties thereon or therefor.

What I claim is:

1. Means for holding a hose end in a predetermined axially aligned position, comprising means resiliently urged inwardly to engage the extreme end of the hose at a plurality of points about its periphery to urge the hose into the said axially aligned position, and means for positively holding the hose in this position at a point slightly spaced from the said extreme end of the hose.

2. A device for holding a hose end in a predetermined axially aligned position, comprising clamping means for positively holding the hose close to its extreme end, means resiliently urged radially inwardly to engage the said extreme end of the hose at a plurality of points about its periphery to urge said extreme end into said axially aligned position, and manual means for moving said resiliently urged means outwardly when mounting or removing the hose from the device.

WALLACE E. ZIEGLER.